Patented Oct. 21, 1924.

1,512,863

UNITED STATES PATENT OFFICE.

THEODOR SCHMIEDEL, OF NUREMBERG-DOOS, AND HANS KLENCKE, OF FRANKFORT-ON-THE-MAIN, GERMANY.

PROCESS FOR THE PRODUCTION OF SULPHURIC ACID.

No Drawing.      Application filed May 3, 1922. Serial No. 558,273.

*To all whom it may concern:*

Be it known that we, THEODOR SCHMIEDEL and HANS KLENCKE, citizens of the German Republic, and residing at Nuremberg-Doos, Herderstrasse 3, and Frankfort-on-the-Main, Schwanthalerstrasse 72, have invented certain new and useful Improvements in Processes for the Production of Sulphuric Acid, of which the following is a specification.

This invention relates to a process for the production of sulphuric acid, and is an improvement in or modification of the process described and claimed in the specification of the Patent No. 1,399,526 (Serial No. 403,417) hereinafter called the main patent.

In the specification of said main patent, a process for the production of sulphuric acid without the usual lead chambers or towers has been described, according to which the whole process of the formation of sulphuric acid is effected in a shorter space and time than was hitherto possible. Said process consists in bringing a solution of nitrosyl sulphuric acid in sulphuric acid having a minimum density of 54° Bé., in the form of a fine spray or mist, into intimate contact with gases containing sulphur dioxide, the quantity employed being such that, throughout the system, the said solution nowhere loses its activity to such an extent as to become incapable of oxidizing said sulphuric acid, in other words, that it always contains nitrosyl sulphuric acid. The process further consists in thereafter withdrawing an amount of said circulating nitrosyl sulphuric acid, corresponding approximately to the amount of sulphuric acid produced, and in denitrating same, in any suitable manner, to form commercial sulphuric acid.

In the specification of said main patent, it is mentioned that the strength of the nitrosyl sulphuric acid should be preferably within the limits of 54–58° Bé.

Accordingly, the resulting commercial sulphuric acid will also be within these limits of concentration. However, there are numerous cases in which an acid stronger than 58° Bé., is required. The endeavour was, therefore, in such cases to obtain by this process also an acid having a higher degree of concentration. Inasmuch as a uniform concentration of acid is maintained in the process generally, and inasmuch as the tendency exists for the concentration of the acid to increase owing to the formation of sulphuric acid, it was hitherto the practice, in order to maintain the desired concentration of the acid, to introduce a corresponding amount of water into the plant. If this addition of water is restricted a more concentrated acid is automatically produced. This acid of higher concentration has a stronger power for dissolving nitrosyl sulphuric acid gases. However, it has also a stronger affinity for the water required for the formation of sulphuric acid. If, therefore, it is desired to work the process with an acid of higher concentration, it is necessary when a certain concentration has been reached to provide means for lowering the affinity for the water required for the formation of sulphuric acid. This is effected in accordance with the present invention by maintaining the temperature of the acid somewhat higher. However, it should be remarked that for a limited increase in the concentration of the acid, say for example, from 58° Bé. to about 59° Bé., such an increase of temperature is not required, but only if it is intended to work with densities of 60° Bé. and over. The increase of temperature is effected by merely lessening the cooling of the acid which is automatically heated by the heat of reaction.

A further possibility of working with an acid of higher concentration consists in using the so-called double-circuit irrigation. This consists in irrigating with an acid of a high degree of concentration, the forepart of the plant, that is those mixing chambers which the gases containing sulphur dioxide enter first, as well as the rear part of the plant, that is the mixing chambers, at the exit, whilst the middle part of the plant is irrigated with a weaker acid (above 54° Bé.) It is of course necessary to collect both acids in different receptacles so that they cannot mix. The effect of this kind of irrigation is that the high grade acid very completely and quickly absorbs the nitrosyl sulphuric acid gases in the mixing chambers through which said high grade acid passes, thus forming nitrosyl sulphuric acid of high percentage. Naturally, in consequence of its high content of nitrosyl, this high grade nitrosyl sulphuric acid effects a very high oxidizing action, in the first mixing apparatus, and thus further accelerates the process. On the other hand, the weaker acid in the middle parts of the plant exercises a favourable influence on the formation of sulphuric acid in consequence of its higher content of water, and of the loosely combined nitrous oxides, especially since the strong acid in the first mixing chambers has almost completely absorbed the water content of the gases containing sulphur dioxide. By reason of this divided irrigation, it is possible to obtain an acid of very high concentration, in some cases above 60° Bé., and on the other hand to avoid an excessive temperature in the plant, especially in the middle chambers.

The carrying out of the process with acid of different degrees of concentration now enables a further development which effects a surprisingly great acceleration of the progress of the reaction. This new way of carrying out the process consists in the following:—

Assuming a plant of several units (mixing devices) to be used for carrying out the process; the gases containing sulphur dioxide enter the first mixing chamber and the mixing devices are irrigated from a common tank, containing a solution of nitrosyl sulphuric acid in sulphuric acid, in such a manner that a certain amount of nitrosyl sulphuric acid flows into each mixing device and that the nitrosyl sulphuric acid flowing off from each mixing device is returned to one common tank, in which the acid is mixed again and returned to the cycle of the system. So far, the procedure corresponds exactly the way the process has been hitherto carried out, but whereas, according to this previous way of carrying out the process, the gases next pass through a number of mixing devices and meet everywhere nitrosyl sulphuric acid of the same concentration until their content of sulphur dioxide has been practically completely oxidized, and simultaneously the nitrous oxides which have entered the gas as a result of the reaction, have been taken up by the irrigating acid, the new way of carrying out the process introduces a modification, after a certain number of mixing devices, about three or more have been traversed, in so far that the concentration of the nitrosyl sulphuric acid is reduced, by the sudden addition of the entire water required for the process, to such an extent that it is freed very considerably although not completely, from its contents in nitrosyl sulphuric acid, i. e., until it has been practically completely denitrated. Consequently, large volume of nitrous vapours enter the gas and thereby effect very rapid and complete oxidation of the sulphur dioxide still contained therein, this action being further supported by the large addition of water to the acid sprayed in the mixing device against the gases. The gases leave the mixing device in which this process is effected, practically free from sulphur dioxide, but contain instead, a high percentage of nitrous oxide. Consequently care now has to be taken that these nitrogen compounds are retained by sulphuric acid. For this purpose, it is necessary to allow a certain time for the gases to give off their contents in oxygen to the nitrogen compounds, which is done by correspondingly retarding the movement of the gases. This is effected either by introducing the gases, after leaving the last mixing device, into a large empty chamber or by passing them through a sufficiently long pipe or in any other suitable manner. This is succeeded by an absorption installation of any kind in which the gases give up their contents in nitrogen-oxygen compounds to strong sulphuric acid and thereby form nitrosyl sulphuric acid. For this purpose devices of a known kind irrigated with strong sulphuric acid which may contain nitrosyl sulphuric acid, or boxes containing roller distributing devices, may be used.

In the new way of carrying out the process, the main part of the sulphur dioxide content, as hitherto, is rapidly worked up in the first mixing chambers of the installation, and the diluted remainder is almost instantaneously oxidized by the sudden disengagement of the nitrogen oxide compounds liberated by means of water, so that further mixing devices are dispensed with.

Having now particularly described and ascertained the nature of our said invention and in what manner the same is to be performed, we declare that what we claim is:—

1. A process for manufacturing sulphuric acid without the customary lead chambers or reaction towers, comprising the bringing together of a solution of nitrosyl sulphuric acid in sulphuric acid in very fine subdivision and $SO_2$-containing gases with the help of a mechanical mixing device, the solution being used in an amount such that at no point in the plant does the solution, as a result of the de-nitration, lose its power of oxidizing $SO_2$, the acid solution of nitrosyl sulphuric acid having a concentration above that corresponding to 58° Bé.

2. A process for manufacturing sulphuric acid without the customary lead chambers or reaction towers, comprising the bringing together of a solution of nitrosyl sulphuric acid in sulphuric acid in very fine subdivision and $SO_2$-containing gases with the help of a mechanical mixing device, the solution being used in an amount such that at no point in the plant does the solution, as a result of the de-nitration, lose its power of oxidizing $SO_2$, the acid solution of nitrosyl sulphuric acid having a concentration above that corresponding to 58° Bé. and maintaining the nitrosyl sulphuric acid at an elevated temperature.

3. In the process of claim 1, maintaining a portion of the nitrosyl sulphuric acid solution at a lower concentration with respect to sulphuric acid and at a higher concentration with respect to water, than the remaining portions of the nitrosyl sulphuric acid solution.

4. A process for manufacturing sulphuric acid without the customary lead chambers or reaction towers, comprising the bringing together of a solution of nitrosyl sulphuric acid in sulphuric acid in very fine subdivision, and $SO_2$-containing gases with the help of a mechanical mixing device, a portion of the nitrosyl sulphuric acid solution being maintained at a cencentration corresponding to above about 54° Bé. and being intimately mixed with the gases richer in $SO_2$ and a second portion of the nitrosyl sulphuric acid solution being subjected to the action of water in such amounts that the solubility of the solution for nitrogen-oxygen compounds is substantially diminished whereby the nitrous gases are rapidly liberated from the solution and enter the gas mixture and rapidly oxidize the remaining sulphur dioxide contained therein, and whereby the gas mixture thus produced, which at this stage contains relatively a very small proportion of sulphur dioxide, readily oxidizes the nitrogen compounds and subsequently absorbing the oxidized nitrogen compounds in a sulphuric acid solution producing nitrosyl sulphuric acid.

5. In a process of producing sulphuric acid without the customary lead chambers or reaction towers, the steps which comprise intimately mixing gases relatively rich in $SO_2$ with nitrosyl sulphuric acid solution of relatively high concentration with respect to nitrosyl sulphuric acid and subsequently subjecting the gases resulting from this step to the action of a nitrosyl sulphuric acid solution of lower concentration with respect to nitrosyl sulphuric acid and of higher concentration with respect to water than in the preceding step and then subsequently subjecting the gases thus produced to the action of nitrosyl sulphuric acid solution having a higher concentration with respect to nitrosyl sulphuric acid and a lower concentration with respect to water than in the preceding step.

6. In a process of producing sulphuric acid without the customary lead chambers or reaction towers, the steps which comprise intimately mixing gases relatively rich in $SO_2$ with nitrosyl sulphuric acid solution of relatively high concentration with respect to nitrosvl sulphuric acid and subsequently subjecting the gases resulting from this step to the action of a nitrosyl sulphuric acid solution of lower concentration with respect to nitrosyl sulphuric acid and of higher concentration with respect to water than in the preceding step and then subsequently subjecting the gases thus produced to the action of nitrosyl sulphuric acid solution having a higher concentration with respect to nitrosyl sulphuric acid and a lower concentration with respect to water than in the preceding step, and subsequently de-nitrating an amount of the nitrosyl sulphuric acid corresponding to the production of sulphuric acid and separating the de-nitrated sulphuric acid.

7. In a process of producing sulphuric acid without the customary lead chambers or reaction towers, the steps which comprise intimately mixing gases relatively rich in $SO_2$ with nitrosyl sulphuric acid solution of relatively high concentration with respect to nitrosyl sulphuric acid and subsequently subjecting the gases resulting from this step to the action of a nitrosyl sulphuric acid solution of lower concentration with respect to nitrosyl sulphuric acid and a higher concentration with respect to water than in the preceding step and then subsequently subjecting the gases thus produced to the action of nitrosyl sulphuric acid solution having a higher concentration with respect to nitrosyl sulphuric acid and a lower concentration with respect to water than in the preceding step, and subsequently de-nitrating an amount of the nitrosyl sulphuric acid approximately corresponding to the production of sulphuric acid and separating the de-nitrated sulphuric acid.

8. In a process of producing sulphuric acid without the customary lead chambers or reaction towers, the steps which comprise intimately mixing gases relatively rich in $SO_2$ with nitrosyl sulphuric acid solution of relatively high concentration with respect to nitrosyl sulphuric acid and subsequently subjecting the gases resulting from this step to the action of a nitrosyl sulphuric acid solution of lower concentration with respect to nitrosyl sulphuric acid and of higher concentration with respect to water than in the preceding step and subsequently subjecting the gases thus produced to the action of nitrosyl sulphuric acid solution having a higher concentration with respect to nitrosyl sulphuric acid and a lower concentration with respect to water than in the preceding step, and subsequently de-nitrating by means of fresh $SO_2$-containing gases an amount of the nitrosyl sulphuric acid approximately corresponding to the production of sulphuric acid and separating the de-nitrated sulphuric acid.

9. In the process of manufacturing sulphuric acid from gases containing sulphur dioxide without the aid of customary lead chambers or reaction towers, rapidly oxidizing the main portion of the sulphur dioxide contained in the gases and subsequently oxidizing the diluted remainder of the sulphur dioxide by subjecting them to the action of nitrogen-oxygen compounds liberated from a nitrosyl sulphuric acid solution by the addition of water thereto.

10. In the process of manufacturing sulphuric acid from gases containing sulphur dioxide without the aid of customary lead chambers or reaction towers, rapidly oxidizing the main portion of the sulphur dioxide contatined in the gases and subsequently oxidizing the diluted remainder of the sulphur dioxide by subjecting them to the action of nitrogen-oxygen compounds liberated from a nitrosyl sulphuric acid solution by the addition of water thereto and subsequently oxidizing the gases thus produced by means of oxygen and subsequently subjecting the oxidized gases thus produced to the action of the sulphuric acid solution to absorb the oxidized nitrogen oxide compounds.

11. In the process of manufacturing sulphuric acid from gases containing sulphur dioxide without the aid of customary lead chambers or reaction towers, rapidly oxidizing the main portion of the sulphur dioxide contained in the gases and subsequently oxidizing the diluted remainder of the sulphur dioxide by subjecting them to the action of nitrogen-oxygen compounds liberated from a nitrosyl sulphuric acid solution by the addition of water thereto and subsequently oxidizing the gases thus produced by means of oxygen and subsequently subjecting the oxidized gases thus produced to the action of sulphuric acid-containing solution to absorb the oxidized nitrogen oxide compounds.

12. In the process of manufacturing sulphuric acid from gases containing sulphur dioxide without the aid of customary lead chambers or reaction towers, rapidly oxidizing the main portion of the sulphur dioxide contained in the gases and subsequently oxidizing the diluted remainder of the sulphur dioxide by subjecting them to the action of nitrogen-oxygen compounds liberated from a nitrosyl sulphuric acid solution by the addition of water thereto and subsequently oxidizing the gases thus produced by means of oxygen and subsequently subjecting the oxidized gases thus produced to the action of sulphuric acid-containing solution to absorb the oxidized nitrogen oxide compounds, and de-nitrating an amount of the nitrosyl sulphuric acid solution corresponding to the production of sulphuric acid.

13. In the process of manufacturing sulphuric acid from gases containing sulphur dioxide without the aid of customary lead chambers or reaction towers, rapidly oxidizing the main portion of the sulphur dioxide contained in the gases and subsequently oxidizing the diluted remainder of the sulphur dioxide by subjecting them to the action of nitrogen-oxygen compounds liberated from a nitrosyl sulphuric acid solution by the addition of water thereto and subsequently oxidizing the gases thus produced by means of oxygen and subsequently subjecting the oxidized gases thus produced to the action of sulphuric acid-containing solutions to absorb the oxidized nitrogen oxide compounds and denitrating an amount of the nitrosyl sulphuric acid solution corresponding to the production of sulphuric acid and separating the de-nitrated sulphuric acid.

In testimony whereof we affix our signatures in presence of two witnesses.

PH. H. THEODOR SCHMIEDEL.
HANS KLENCKE.

Witnesses:
    ROBERT ENGLER,
    BASIL E. SAVARD.